United States Patent [19]

Parsons

[11] 4,396,280
[45] Aug. 2, 1983

[54] PHOTOGRAPHIC REPROPORTIONING MACHINE AND RADIUS ATTACHMENT THEREFOR

[76] Inventor: James C. Parsons, 1414 Laurel Ave., Minneapolis, Minn. 55403

[21] Appl. No.: 112,134

[22] Filed: Jan. 14, 1980

[51] Int. Cl.³ .................................................. G03B 27/68
[52] U.S. Cl. ........................................ 355/52; 355/71; 355/84; 355/103
[58] Field of Search ...................... 355/52, 71, 84, 103

[56] References Cited

U.S. PATENT DOCUMENTS

| | | | |
|---|---|---|---|
| 1,176,384 | 3/1916 | Lotka | 355/52 UX |
| 1,669,027 | 5/1928 | Seymour | 355/52 UX |
| 2,617,337 | 11/1952 | Snyder | 355/52 UX |
| 2,838,939 | 6/1958 | Schlegel | 355/52 UX |
| 3,051,042 | 8/1962 | Maurer | 355/52 UX |
| 3,066,572 | 12/1962 | von Bubna-Littitz | 355/52 UX |
| 3,115,081 | 12/1963 | Bruce | 355/103 |
| 3,126,809 | 3/1964 | Adams et al. | 355/52 UX |
| 3,158,077 | 11/1964 | Miller et al. | 355/103 |
| 3,204,543 | 9/1965 | O'Keefe | 355/52 UX |
| 3,269,286 | 8/1966 | Fuchs et al. | 355/52 UX |
| 3,309,959 | 3/1967 | Rondthaler et al. | 355/52 UX |
| 3,374,724 | 3/1968 | Torres | 355/52 X |
| 3,401,616 | 9/1968 | Cross | 355/84 |
| 3,445,165 | 5/1969 | Dubbs | 355/84 |
| 3,767,301 | 10/1973 | Solo | 355/52 |
| 3,992,094 | 11/1976 | Adcock | 355/84 |
| 4,008,959 | 2/1977 | Parsons | 355/52 X |
| 4,090,788 | 5/1978 | Massengeil | 355/71 |
| 4,238,156 | 12/1980 | Parsons | 355/52 |

OTHER PUBLICATIONS

Colight . . . , Type-Flex Adv., 6/24/69, Minneapolis, Minn.
Type-Flex Reproportioning System, Snook Corp.
Type-Flex Junior Adv., Snook Corp.
R.I. Bulletin, Stretch or Squeeze Without a Lens, Dec. 15, 1975.
Snook Corp., Miscellaneous Photo Reproportioning Machines, 9/76.
May 1977, Squeeze Lenses vs Photomechanical Newspaper Production Flexing.

Primary Examiner—Richard A. Wintercorn
Attorney, Agent, or Firm—Burd, Bartz & Gutenkauf

[57] ABSTRACT

A photographic reproportioning apparatus for transferring an image from a sheet member to an arcuate image on a photosensitive sheet has first and second travel boards movably supported for movement in a linear direction. A light shield having a uniform exposure line and a taper exposure line is located over the travel boards. Light projected through one of the exposure lines exposes a photosensitive sheet on movement of the sheet under the exposure line. A radius attachment having a circular member is drivably associated with the second travel board to move a photosensitive sheet in an arcuate direction. The sheet member carrying the image is attached to the first travel board and moves in a linear direction whereby the linear image is projected by light passing through the tapered exposure line in an arcuate pattern on the photosensitive sheet as the photosensitive sheet and sheet member having the image pass under the tapered exposure line.

29 Claims, 10 Drawing Figures

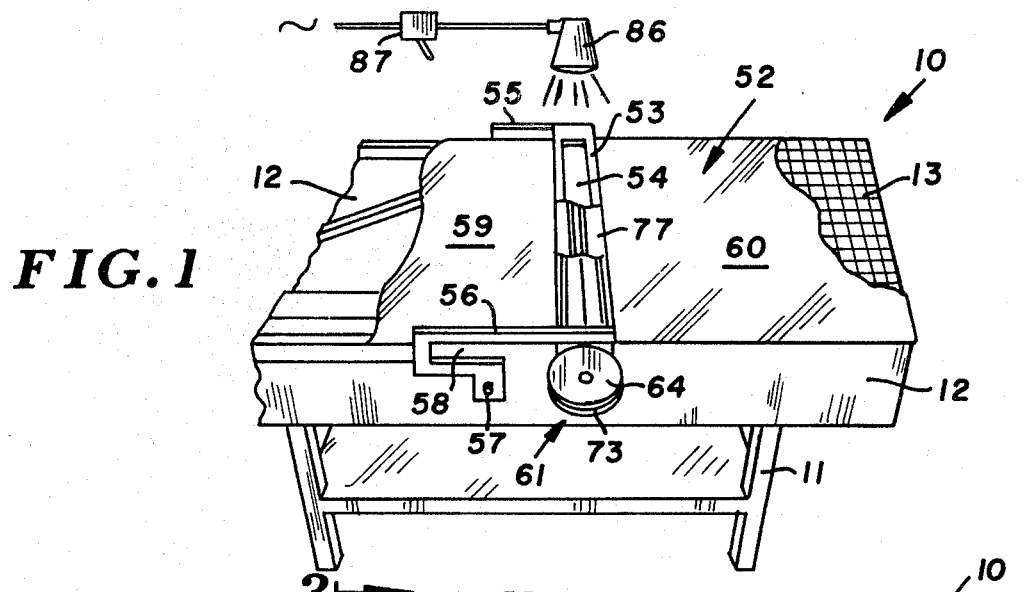
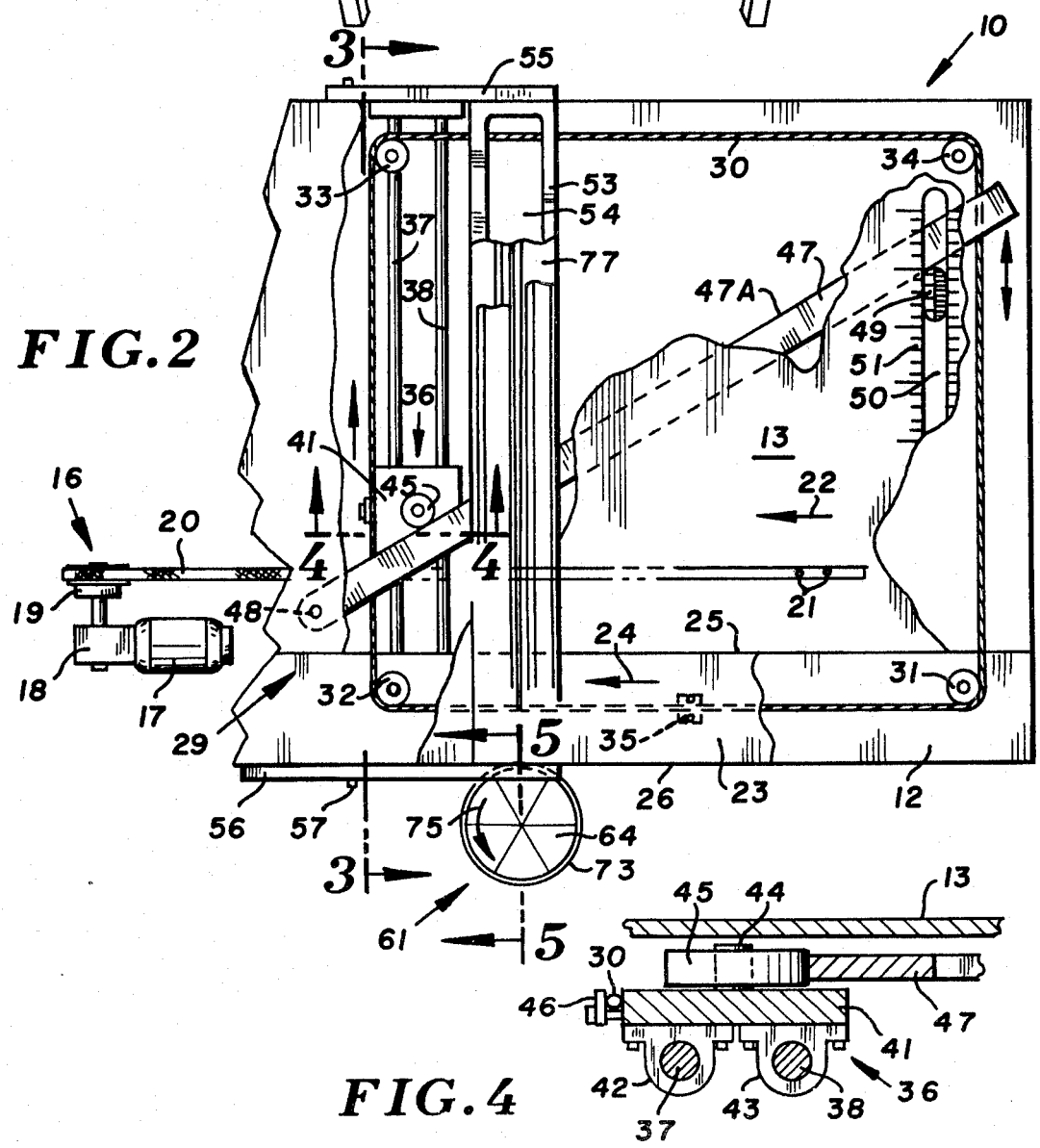

PHOTOGRAPHIC REPROPORTIONING MACHINE AND RADIUS ATTACHMENT THEREFOR

SUMMARY OF INVENTION

An apparatus useable to change the size of one dimension of a two-dimension image on a photosensitive medium is disclosed in U.S. Pat. No. 4,008,959. The apparatus includes a circular disc located in driving engagement with the main travel board. The disc rotates in response to the speed of the main travel board. The speed of rotation of the disc relative to the main travel board cannot be adjusted. This limits the utility of the machine.

The invention is directed to a radius attachment for a photographic reproportioning machine which will move a photosensitive sheet in an arcuate path which can be selected by adjusting the speed of rotation of a circular member relative to the linear speed of the means carrying the sheet member having the image. The radius attachment has a base mounted on the frame of the machine adjacent the second travel board of a photographic reproportioning machine. The second travel board has a linear edge facing a circular member. The circular member is rotatably mounted on the base for rotation about an axis that is generally perpendicular to the linear movement of the second travel board. An annular means, as a friction drive ring, is associated with a circular member and engageable with a linear edge of the second travel board so that on movement of the second travel board the circular member is rotated. The photographic reproportioning machine has a motion transmitting means which is operable to adjust the relative speed between the main travel board and the second travel board whereby the speed of rotation of the circular member relative to the main travel board is adjusted. This adjustment changes the effective radius of curvature of the arcuate movement of the photosensitive sheet so that the arc of the image projected on the photosensitive sheet can be accurately controlled.

The photographic reproportioning machine is provided with exposure window means having a first transverse exposure window that is used in the rectilinear reproportioning of an image on a photosensitive sheet. Located adjacent the first exposure window is a second transverse window. The second transverse window is in transverse alignment with the axis of rotation of the circular member and converges toward the axis of rotation of the circular member. Separate movable covers mounted on the shield means are selectively useable to close the windows so that only one window allows light to be projected onto the main travel board.

IN THE DRAWINGS

FIG. 1 is a fragmentary perspective view of a photographic reproportioning machine equipped with the variable radius apparatus of the invention;

FIG. 2 is a top plan view of the photographic reproportioning apparatus of FIG. 1 with the light masks removed and the main travel board broken away;

FIG. 4 is an enlarged sectional view taken along the line 4—4 of FIG. 2;

DESCRIPTION OF PREFERRED EMBODIMENT

Figure 3:
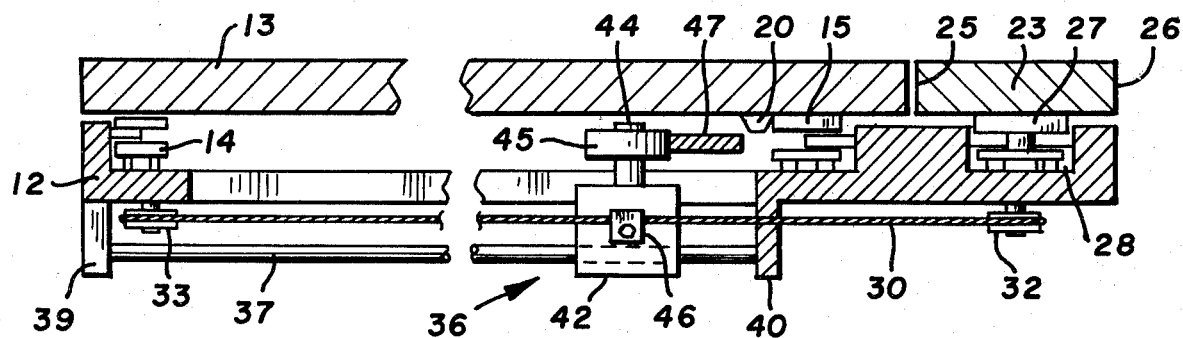
FIG. 3 is an enlarged foreshortened sectional view taken along the line 3—3 of FIG. 2.
Figure 6:
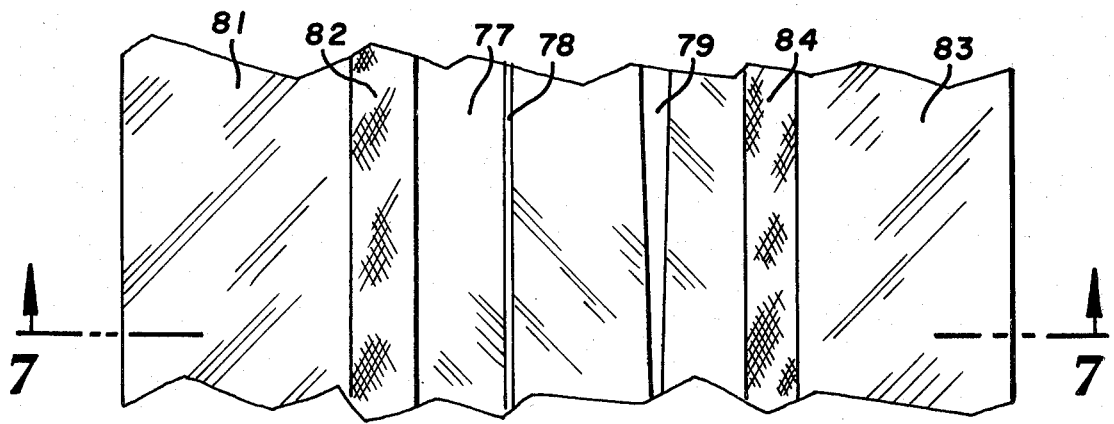
FIG. 6 is an enlarged fragmentary plan view of the exposure lines and covers therefor.
Figure 7:
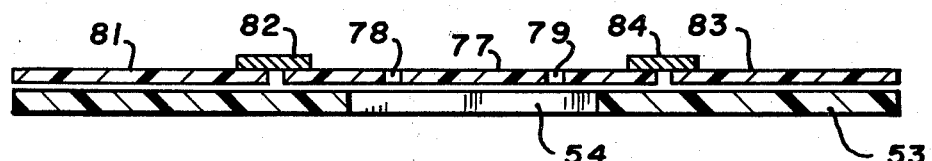
FIG. 7 is a sectional view taken along the line 7—7 of FIG. 6.

Referring to FIGS. 1 and 2, there is shown the photographic reproportioning apparatus indicated generally at 10. Apparatus 10 is operable to reproportion a two-dimensional image in one dimension without changing the second dimension. An example of photographic reproportioning apparatus 10 is disclosed in U.S. Pat. No. 4,008,959. Apparatus 10 has a frame 11 supporting a stationary member or table 12. A main travel board 13 is movably mounted on top of table 12. As shown in FIG. 3, skates 14 and 15 movably support main travel board 13 on table 12. The skates have a plurality of vertical and horizontal rollers which guide the main travel board 13 from movement along a linear path, as indicated by arrow 22 in FIG. 2.

Main travel board 13 is moved in the linear path by a drive apparatus indicated generally at 16. Apparatus 16 comprises a reversible electric motor 17 connected to a gear box 18. The output of gear box 18 drives a pulley 19 operatively associated with an endless belt 20, such as the V-belt. Belt 20 has an upper run that extends under main travel board 13 and is connected thereto with connectors 21. On operation of motor 17, the belt 20 moves main travel board 13 in the direction of arrow 22 relative to table 12.

Referring to FIGS. 2 and 3, an elongated generally flat second or sub-travel board 23 is located adjacent the near linear edge of travel board 13. Second board 23 moves in the direction of arrow 24 which is parallel to and in the same direction as the movement of the board 13 shown by arrow 22. Second board 23 has an inside edge 35 located in contiguous relationship with the adjacent edge of board 13. Second board 23 has an outside linear edge 26 that moves in the direction of arrow 24 along with board 23. The board 23 is movably supported on table 12 with a plurality of skates 27. Each skate has horizontal and vertical rollers which locate the skate in a groove 28 in table 12 so that second board 23 moves in a linear path parallel to the linear path of movement of main board 13.

The movement of second board 23 relative to the first board 13 is controlled with a motion transmission means indicated generally at 29. Motion transmission means 29 is adjustable to vary the relative movement of second board 23 relative to first board 13. Motion transmission means 29 operates to control the speed of the second board 23 to an adjusted rate that may be equal to or less than the linear speed of main travel board 13. Motion transmission means 29 includes an endless cable 30 trained about pulleys 31, 32, 33, and 34. Each pulley 31-34 is rotatably mounted on an upright axle secured to frame 12 below travel boards 13 and 23, as shown in FIG. 2. Cable 30 is connected to the second travel board 23 with a clamp 35 so that the movement of table 23 corresponds to the movement of cable 30.

A transversely movable slide means indicated generally at 36 is located below the forward side of main travel board 13. Slide means 36 is movably mounted on a pair of transverse rods 37 and 38. Opposite ends of rods 37 and 38 are attached to downwardly directed supports 39 and 40 secured to table 12. Slide means 36 comprises a block or plate 41 attached to a pair of linear bearings 42 and 43 slidably mounted on rods 37 and 38, respectively. An upright axle or pin 44 is attached to block 41. A roller 45 is rotatably mounted on axle 44. A clamp or fastener 46 attaches cable 30 to the side of block 41 so that slide means 36 moves with cable 30 along rods 37 and 38.

An elongated adjustable speed control arm 47 is located below main travel board 13. Arm 47 has a forward end located in the lower left corner of travel board 13, as shown in FIG. 2. An upright pivot 48, as a nut and bolt assembly, pivotally connects the arm 47 for pivotal movement about an upright axis to board 13. Arm 47 extends rearwardly and outwardly from pivot 48 in a generally diagonal line under main travel board 13. Arm 47 has a linear edge 47A that engages the outer peripheral surface of roller 45. As shown in FIG. 4, arm 47 is located in generally the same horizontal plane as the roller 45. The outer or free end of arm 47 bears against an adjustable stop 49. Stop 49 is located in a slot 50 in the trailing side of main travel board 13. A clamp structure (not shown) mounted on board 13 is used to hold stop 49 in its adjusted position. Both stop 49 and board 13 have scales which are calibrated to the percentage of enlargement or reduction of the image projected on the photosensitive sheet member.

Referring to FIG. 1, a light shield or mask indicated generally at 52 is located over travel boards 13 and 23. Mask 52 has a transverse plate or member 53 having a transverse slot 54. Member 53 is mounted on a pair of arms 55 and 56 pivotally mounted to frame 12. Arm 55 is pivotally connected with a pivot member 56 to the side of frame 12. A similar pivot member pivotally mounts arm 55 to the opposite side of frame 12. Arm 56 has an elongated longitudinal slot 58 to allow angular movement of the negative carrying structure, as hereinafter described. Mask 52 has a pair of flexible sheet members 59 and 60 attached to opposite sides of member 53. Members 59 and 60 are of a size to cover the entire top of boards 13 and 23.

Figure 5:
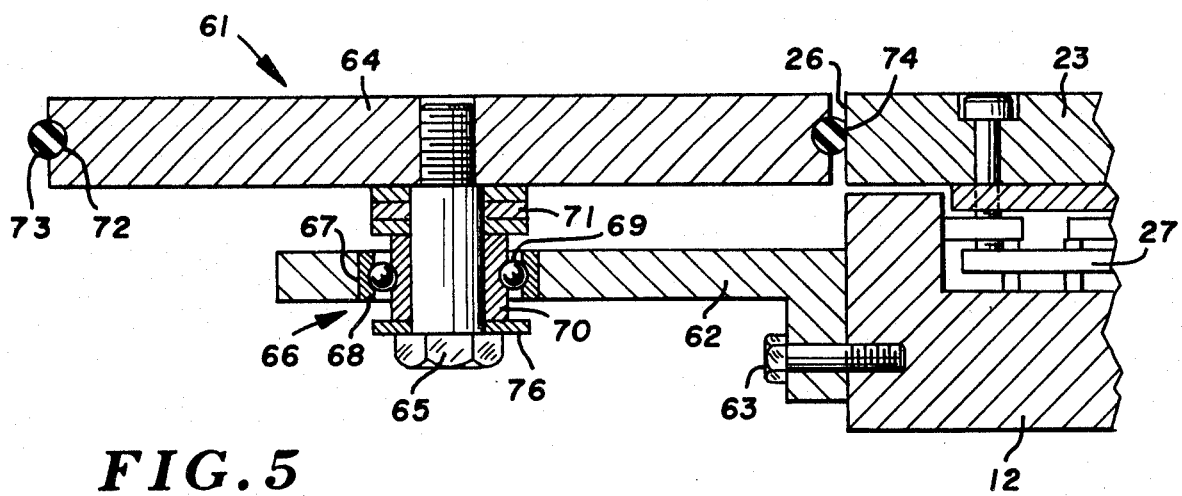
FIG. 5 is an enlarged sectional view taken along the line 5—5 of FIG. 2.

Referring to FIGS. 2 and 5, there is shown a variable radius apparatus indicated generally at 61 attached to the table 12 adjacent sub-travel board 23. Apparatus 61 has a base 62 attached with a pair of bolts 63 to the side of table 12 below travel board 23. A disc or circular plate 64 is located above base 62 and rotatably mounted thereon with a roller bearing 66. Bearing 66 is located within a hole 67 of base 62. Bearing 66 has an outer race 68 in tight engagement with base 62. A plurality of roller means or balls 69 rotatably mount an inner race 70 to outer race 68. Inner race 70 has a length longer than the outer race and extends above and below base 62. The upper end of inner race 70 engages spacers 71, as washers, which bear against the bottom of disc 64. The head of bolt 65 engages a washer 76 that bears against the lower end of inner race 70 thereby clamping the disc 64 in a fixed position on inner race 70.

Disc 64 has an outer peripheral groove 72 accommodating a resilient ring or O-ring 73. Ring 73 bears against the edge 26 of travel board 23 at a flattened engaging area 74, as shown in FIG. 5. Movement of the travel board 23 in the direction of the arrow 24 will turn or rotate disc 64 in the direction of arrow 75. Disc 64 rotates about the upright or vertical axis of bolt 65. The speed of rotation of the disc 64 is dependent on the speed of movement of the sub-travel board 23. The speed of the board 23 can be adjusted by adjusting the angular position of arm 47. This is done by changing the location of stop 49 in slot 50. Thus, the angular position of arm 47 relative to the main travel board 13 adjusts the speed of rotation of disc 64 relative to main travel board 13.

Figure 8:
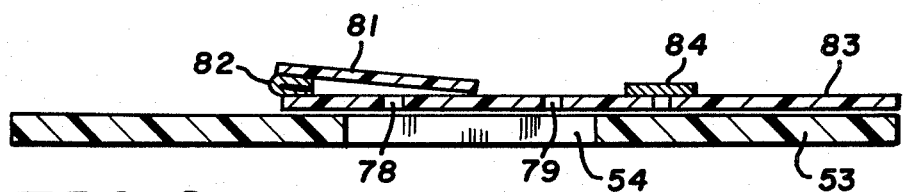
FIG. 8 is a sectional view similar to FIG. 7 showing the straight exposure line shielded with a cover.
Figure 9:
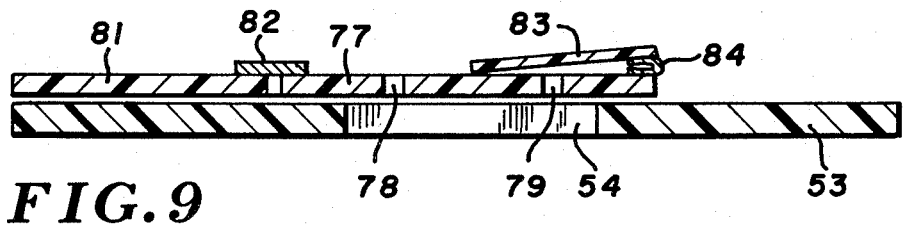
FIG. 9 is a sectional view similar to FIG. 6 showing the tapered exposure line shielded with a cover.
Figure 10:
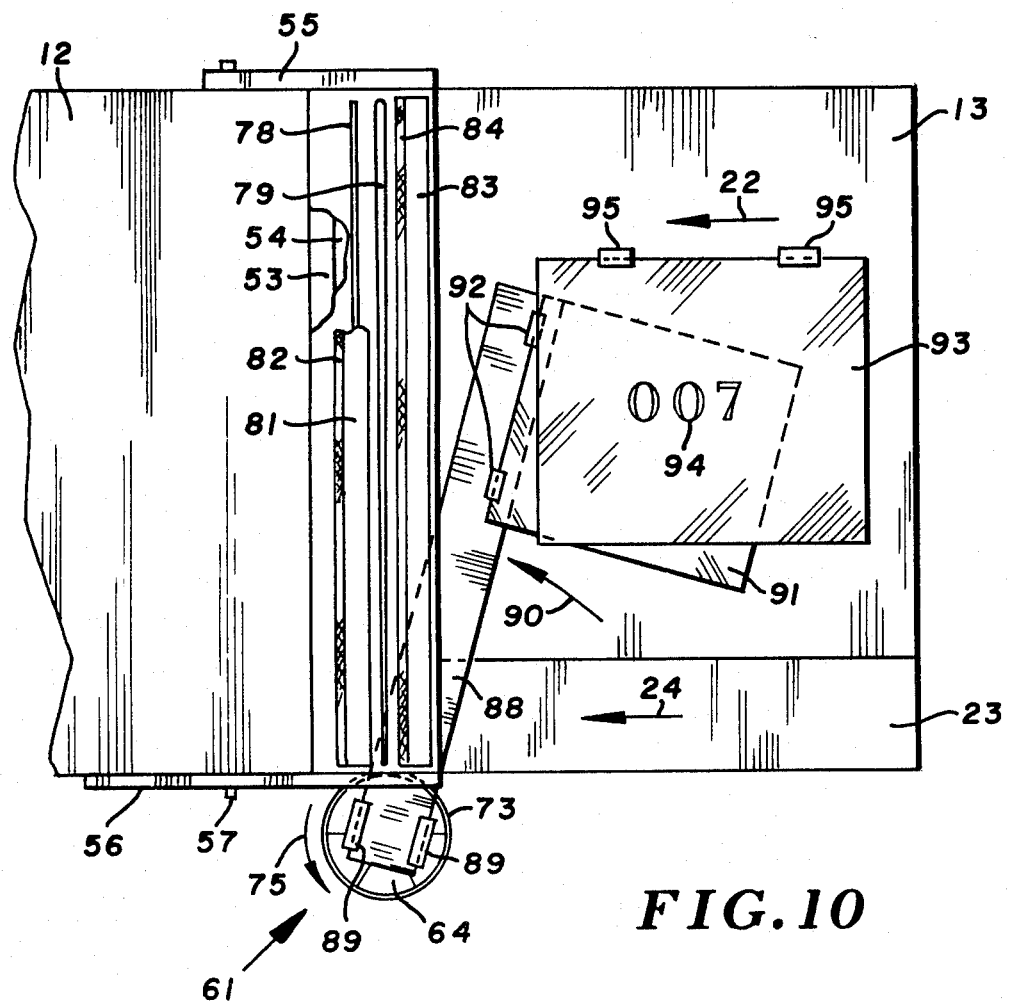
FIG. 10 is a diagrammatic plan view showing the positions of the negative and photosensitive sheet member to make a curved image from linear art work.

As shown in FIGS. 2 and 10, sheet member 77 is attached to member 53 and extends along the length thereof. Sheet member 77 has a pair of exposure lines 78 and 79 aligned with slot 54 to allow light to project onto the top of the travel board 13. Exposure line 78 is an elongated linear line or window having a substantially uniform width extended transversely of main travel board 13. Exposure line 79 has a uniform taper that converges toward sub-travel board 23. Exposure line 79 is in transverse alignment with the axis of rotation of disc 64. Sheet member 77 is opaque, as a black film, with exposure lines 78 and 79 being transparent elongated windows in sheet member 77. A first cover 81 is articulately connected with a hinge 82 to the left side of the sheet member 77, as shown in FIGS. 6-9. Cover 81 is adapted to be turned over onto sheet member 77 to cover the exposure line 78, as shown in FIG. 8. The light is only allowed to pass through the tapered exposure line 79 onto the top surface of travel board 13. A second cover 82 is articulately connected with a hinge 84 to the other or right side of sheet member 77, as shown in FIGS. 6-9. Cover 83 can be turned over the top of sheet member 77 to cover the tapered exposure line 79, as shown in FIG. 9. Cover 81 is turned to the open position, thereby opening the exposure line 78. The linear even exposure line 78 is used to allow light from lamp 86 to expose a photosensitive sheet moving in a linear direction under the exposure line. Lamp 86 is contorlled with a switch 87. Switch 87 can be part of the controls mounted on the photographic reproportioning machine. Exposure line 78 is used when the reproportioning machine is in the linear reproportioning mode, where the negative and photosensitive sheet are selectively mounted on travel boards 13 and 23.

As shown in FIG. 10, an elongated flat carrier arm 88 is attached to disc 64 with attaching means, as tape 89. Arm 88 extends over the top of travel board 13 and moves in the forward angular direction, as indicated by arrow 90 corresponding to the angular movement of disc 64. The axis of the angular movement of arm 88 is the axis of rotation of disc 64.

A light sensitive or photographic sensitive sheet 91 is attached to the outer end of arm 88 with attaching means, as tape 92. The arm 88 moves the photosensitive sheet 91 in an arcuate path, as indicated by arrow 90, under the tapered exposure line 79. A negative 93 containing an image 94 is located over light sensitive sheet 91 and attached to the main travel board 13 with fastening means 95, as tape. Negative 93 moves in the linear direction indicated by arrow 22 of travel board 13 under the tapered exposure line 79. The relative linear movement of travel board 13 and arcuate movement of the light sensitive sheet 91 is variable to change the effective radius or arc of movement of the light sensitive sheet 91. This adjustment is achieved by moving arm 47 to an adjusted position and thereby changing the linear speed of the travel board 23. Since the travel board 23 drives disc 64, the speed of the travel board 23 in the direction of the arrow 24 relative to the speed of travel board 13 is determinative of the rate of arcuate movement of light sensitive sheet 91. The result is that the operator can control the arc or curvature of image 94 being projected onto the light sensitive sheet 91 as light sensitive sheet 91 and negative 93 pass under tapered exposure line 79.

While there has been shown and described the preferred embodiment of the variable radius apparatus of the invention used with a photographic reproportioning machine, it is understood that changes in the structure, arrangement of structure, size of structure and materials, can be made by those skilled in the art without departing from the invention. The invention is defined in the following claims.

The embodiments of the invention in which an exclusive property or privilege is claimed are defined as follows:

1. An apparatus for transferring a linear image from a sheet member or film and reproportioning the image to an arcuate image on a photosensitive sheet comprising: a frame, a first travel board movably supported on the frame, said first travel board having a surface for carrying a sheet member having a linear image, drive means for moving said first travel board in a linear direction, means having elongated exposure line means located adjacent said first surface, said exposure line means allowing light to project onto said surface, a second movable travel board having a linear edge extended in the direction of movement of the second travel board transmitting means connected to the first travel board and second travel board operable to move the second travel board in response to movement of the first travel board, a circular member located adjacent the linear edge of the second travel board, means rotatably mounting the circular member on said frame, means mounted on the circular member engageable with said linear edge for rotating the circular member in response to linear movement of the second travel board, and arm means attached to the circular member and extended over the surface of the first travel board adapted to be attached to a photosensitive sheet whereby on movement of the first travel board the motion transmission means moves the second travel board which rotates the circular member thereby moving the photosensitive sheet in an arcuate direction relative to the image carrying sheet member on the first travel board to project the image in an arcuate pattern on the photosensitive sheet as the photosensitive sheet and image carrying sheet member pass under the exposure line means.

2. The apparatus of claim 1 wherein: the motion transmitting means has means to adjust the relative speed between the first and second travel boards thereby adjusting the rotational speed of the circular member relative to the first travel board.

3. The apparatus of claim 1 wherein: said exposure line means extends transversely of the direction of movement of the first travel board and in alignment with the axis of rotation of the circular member.

4. The apparatus of claim 3 wherein: said exposure line means comprises a light transparent window that converges in width toward the axis of rotation of the circular member.

5. The apparatus of claim 1 wherein: said exposure line means comprises a first light transparent window having a generally uniform width, and a second light transparent window transversely in alignment with the axis of rotation of the circular member, said second light transparent window converging in width toward the axis of rotation of the circular member, and means for selectively covering said first and second light transparent windows.

6. The apparatus of claim 1 wherein: the means rotatably mounting the circular member on the frame includes a base, means connecting the base to the frame, and means rotatably mounting the circular member on the frame for rotation about an upright axis.

7. The apparatus of claim 1 wherein: the circular member has an outer peripheral edge having an outwardly open groove therein, and said means mounted on the circular member includes an annular resilient means located in said groove and engageable with the linear edge of the second travel board whereby on movement of the second travel board the circular member is rotated.

8. The apparatus of claim 7 wherein: said annular resilient means is an O-ring.

9. The apparatus of claim 1 wherein: the circular member has a generally flat upper surface located in the general plane of the surface of the first travel board.

10. An apparatus for transferring a linear image from a sheet member or film and reproportioning the image to an arcuate image on a photosensitive sheet comprising: a frame, first means movably supported on the frame, said first means having a portion for carrying a sheet member having a linear image, drive means for moving said first means in a linear direction, means having elongated exposure window means located adjacent said first means and extended generally transverse to the direction of movement of the first means, said exposure window means allowing light to project onto said portion of the first means, second means movable relative to the first means in the linear direction of the first means, said second means having a linear edge extended in the direction of movement of the second means, motion transmitting means associated with the first and second means operable to move the second means in response to movement of the first means, circular means located adjacent the linear edge of the second means, means rotatably mounting the circular means on said frame for rotation about an axis normal to the linear edge of the second means, means cooperating with the circular member and said linear edge for rotating the circular means in response to movement of the second means, and means attached to the circular means and extended over the portion of the first means adapted to be attached to a photosensitive sheet whereby on movement of the first means the sheet member having the image moves in said linear direction, the motion transmission means moves the second means causing the circular means to rotate about said axis and moving the photosensitive sheet in an arcuate direction relative to the sheet member having the image to project the image in an arcuate pattern on the photosensitive sheet as the photosensitive sheet and sheet member having the image pass under the exposure window means.

11. The apparatus of claim 10 wherein: the motion transmission means has means to adjust the relative speed between the first and second means thereby adjusting the rotational speed of the circular means relative to the first means.

12. The apparatus of claim 10 wherein: said exposure window means extends transversely of the direction of movement of the first means and in alignment with the axis of rotation of the circular means.

13. The apparatus of claim 12 wherein: said exposure window means comprises a light transparent window that converges in width toward the axis of rotation of the circular means.

14. The apparatus of claim 10 wherein: said exposure window means comprises a first light transparent window having a general uniform width, and a second light transparent window transversely aligned with the axis of rotation of the circular means, said second light transparent window converging in width toward the axis of rotation of the circular means, and means for selectively covering said first and second light transparent windows.

15. The apparatus of claim 10 wherein: the means rotatably mounting the circular means on the frame includes a base, means connecting the base to the frame, and means rotatably mounting the circular means on the frame for rotation about its axis.

16. The apparatus of claim 10 wherein: the circular means has an outer peripheral edge having an outwardly open groove therein, said means cooperating with the circular means and linear edge including an annular resilient means located in said groove and engageable with the said linear edge of the second means whereby on movement of the second means the circular means is rotated.

17. The apparatus of claim 16 wherein: said annular resilient means is an O-ring.

18. The apparatus of claim 10 wherein: the circular means is a circular disc having a generally flat upper surface located in the general plane surface, said surface being located in the general plane of the portion of the first means.

19. A radius attachment for a photographic reproportioning machine having a frame, a first means movable on said frame in a linear direction, a second means movable on said frame in the linear direction of the first means, drive means for moving the first means in the linear direction, and motion transmission means operably connecting the first and second means and moving the second means in response to movement of the first means at a speed related to the movement of the first means comprising: a base mounted on the frame adjacent the second means, a circular member located adjacent the second means, means rotatably mounting the circular member on the base, and means associated with the circular member for rotating the circular member in response to movement of the second means.

20. The attachment of claim 19 wherein: said base is a generally flat plate member projected outwardly from said frame, said plate member having an end located in engagement with the frame, and means for connecting said end to said frame.

21. The attachment of claim 19 wherein: the means rotatably mounting the circular member on the base includes a bearing mounted on the base, and a rotatable member mounted on the bearing and secured to the circular member.

22. The attachment of claim 19 wherein: the circular member has an outer peripheral edge having an outwardly open groove therein, and said means associated with the circular member includes an annular resilient means located in said groove and engageable with the second means whereby on movement of the second means the circular member is rotated.

23. The attachment of claim 22 wherein: said annular resilient means is an O-ring.

24. The attachment of claim 19 wherein: the circular member has a generally flat upper surface located in the general plane of a top surface of the first means.

25. The attachment of claim 19 including: arm means mounted on the circular member and extended over the first and second means, said arm means being adapted to be connected to a photosensitive sheet member.

26. Exposure means for a photographic reproportioning apparatus having movable means for supporting a photosensitive sheet and a sheet member having an image comprising: light shielding means for shielding the movable means and photosensitive sheet and sheet member supported by the movable means, light exposure window means located adjacent said movable means for allowing light to project on said movable means to expose said photosensitive sheet, said light exposure window means having a first end and a second end and an elongated light transparent window uniformly converging in width from the first end to the second end thereof.

27. The exposure means of claim 26 including: means for covering said elongated light transparent window.

28. The exposure means of claim 26 wherein: said light exposure window means comprises a first light transparent window having a generally uniform width and a second light transparent window located adjacent the first light transparent window, said second light transparent window having a first end and a second end and converging in width from the first end to the second end, and means for selectively covering said first and second light transparent windows.

29. The exposure means of claim 28 wherein: said means for selectively covering said first and second light transparent windows includes a first cover for covering said first light transparent window and a second cover for covering said second light transparent window.

* * * * *

UNITED STATES PATENT AND TRADEMARK OFFICE
CERTIFICATE OF CORRECTION

PATENT NO. : 4,396,280
DATED     : August 2, 1983
INVENTOR(S) : James C. Parsons It is certified that error appears in the above-identified patent and that said Letters Patent is hereby corrected as shown below:

Column 2, line 45, "35" should be -- 25 --.

Column 4, line 30, "82" should be -- 83 --.

Signed and Sealed this

Third Day of January 1984

[SEAL]

Attest:

GERALD J. MOSSINGHOFF

Attesting Officer

Commissioner of Patents and Trademarks